United States Patent
Rousseau

(10) Patent No.: US 11,085,999 B2
(45) Date of Patent: Aug. 10, 2021

(54) TELEMETRY METHOD AND SYSTEM USING AN IMAGER

(71) Applicant: THALES, Courbevoie (FR)

(72) Inventor: Pascal Rousseau, Elancourt (FR)

(73) Assignee: THALES, Courbevoie (FR)

( * ) Notice: Subject to any disclaimer, the term of this patent is extended or adjusted under 35 U.S.C. 154(b) by 505 days.

(21) Appl. No.: 16/067,065

(22) PCT Filed: Nov. 30, 2016

(86) PCT No.: PCT/EP2016/079287
§ 371 (c)(1),
(2) Date: Jun. 28, 2018

(87) PCT Pub. No.: WO2017/114622
PCT Pub. Date: Jul. 6, 2017

(65) Prior Publication Data
US 2019/0011540 A1    Jan. 10, 2019

(30) Foreign Application Priority Data

Dec. 29, 2015    (FR) .................................... 15/02709

(51) Int. Cl.
*G01C 3/08*    (2006.01)
*G01S 7/4863*    (2020.01)
(Continued)

(52) U.S. Cl.
CPC ............ *G01S 7/4863* (2013.01); *G01S 7/481* (2013.01); *G01S 7/499* (2013.01); *G01S 17/10* (2013.01); *G01S 17/42* (2013.01)

(58) Field of Classification Search
CPC .......... G01S 17/42; G01S 17/10; G01S 7/499; G01S 7/481; G01S 7/4863
(Continued)

(56) References Cited

U.S. PATENT DOCUMENTS

| 6,191,845 B1 | 2/2001 | Hayashi |
| 8,605,260 B2 * | 12/2013 | Rousseau ............ G01S 7/4816 356/5.01 |
| 9,052,381 B2 * | 6/2015 | Woolaway ........... G01S 7/4863 |

FOREIGN PATENT DOCUMENTS

| EP | 2 515 066 A1 | 10/2012 |
| EP | 2 909 649 A1 | 8/2015 |

(Continued)

OTHER PUBLICATIONS

English Translation of Notice of Rejection issued in Japanese Patent Application No. 2018-534163 dated Oct. 6, 2020.

*Primary Examiner* — Mark Hellner
(74) *Attorney, Agent, or Firm* — BakerHostetler

(57) ABSTRACT

A method of measuring distance of a target by a pulse emitter and a matrix detector includes spatial mini-detectors coupled to capacitors whose duration of integration is controlled by a polarization of the mini-detectors. The method includes: A) determination of the direction of the target with respect to a known direction of the emitted pulses, and of a first integration period during which an echo of a pulse backscattered by the target is detected by the detector, determining a first distance slice in which the target is situated, B) reduction of the first distance slice in the course of successive telemetry iterations, that is to say emission of a pulse by the emitter and testing of detection of an echo by the detector, which are carried out: on the basis of the first integration period, by dichotomy of the duration of integration, and based on the detection of an echo of the target, a second distance slice in which the target is situated and included in the first distance slice, being determined on completion of this step, C) reduction of the second distance slice in the course of successive telemetry iterations which are carried out: on the basis of the integration period arising from step B, by variations of the position of the integration (Continued)

period, with constant durations of integration, and based on the detection of an echo of the target, a third distance slice in which the target is situated and included in the second distance slice, being determined on completion of this step.

10 Claims, 10 Drawing Sheets

(51) Int. Cl.
  *G01S 7/481* (2006.01)
  *G01S 17/42* (2006.01)
  *G01S 7/499* (2006.01)
  *G01S 17/10* (2020.01)

(58) Field of Classification Search
  USPC .................................................... 356/5.01
  See application file for complete search history.

(56) References Cited

FOREIGN PATENT DOCUMENTS

| | | | |
|---|---|---|---|
| JP | 2000-146523 | A | 5/2000 |
| JP | 2005-127826 | A | 5/2005 |
| WO | 2010/063805 | A1 | 6/2010 |
| WO | 2014/060599 | A1 | 4/2014 |

\* cited by examiner

TELEMETRY METHOD AND SYSTEM USING AN IMAGER

CROSS-REFERENCE TO RELATED APPLICATIONS

This application is a National Stage of International patent application PCT/EP2016/079287, filed on Nov. 30, 2016, which claims priority to foreign French patent application No. FR 1502709, filed on Dec. 29, 2015, the disclosures of which are incorporated by reference in their entirety.

FIELD OF THE INVENTION

The field of the invention is that of the measurement of distance on the basis of the time for light to propagate between an object to be telemetered, called the target, and the system. The system emits light in the direction of the target. A fraction of the light emitted is backscattered toward the system. The system detects this light and estimates the distance on the basis of the return journey propagation time of the light. This telemetry principle has been used for a long time by laser pulsed telemeters.

BACKGROUND

These telemeters make it possible to measure the distances of non-cooperative targets with metric precision. The emission of the telemeter must be well oriented in the direction of the target and the flux returned must be considerable enough to be able to be detected.

When the target to be reached is small and a long distance away there are two avenues to favor performance. The first is an increase in the illumination of the target. The second is to improve the sensitivity of the receiver.

The increase in the illumination of the target can be obtained by increasing the flux of the emitter and by reducing the divergence of the emission. The increase in the flux of the emission is often limited by ocular safety constraints and the reduction in the divergence imposes high precision in the alignment of the emission on the target.

The principle of having, in the telemeter, a spatial detection allowing good alignment of the emission and a temporal detection for the precision of the telemetry, is described in patents PCT/EP2009/066360 and EP13783289.5. Despite the improvement in the distance measurement process by providing the best possible alignment over the most contributory part of the target through the spatial detection, the range is limited by the capacity of the temporal detection.

SUMMARY OF THE INVENTION

The subject of the invention is a method of measuring distance of a target by means of a pulse emitter and of a matrix detector comprising spatial mini-detectors coupled to capacitors whose duration of integration is controlled by a polarization of the mini-detectors, which comprises the following steps:

A) Determination of the direction of the target with respect to a known direction of the emitted pulses, and of a first integration period during which an echo of a pulse emitted by the emitter and backscattered by the target is detected by the detector, determining a first distance slice in which the target is situated, B) Reduction of the first distance slice in the course of successive telemetry iterations, that is to say emission of a pulse by the emitter and testing of detection of an echo by the detector, which are carried out:
 on the basis of the first integration period,
 by dichotomy of the duration of integration and until a predetermined minimum duration of integration is reached, and
 based on the detection of an echo of the target,
 a second distance slice in which the target is situated, and included in the first distance slice, being determined on completion of this step on the basis of the integration period of the last iteration, C) Reduction of the second distance slice in the course of successive telemetry iterations which are carried out:
 on the basis of the integration period arising from step B,
 by variations of the position of the integration period, with constant durations of integration,
 and based on the detection of an echo of the target,
 a third distance slice in which the target is situated, and included in the second distance slice, being determined on completion of this step.

The noise level associated with the spatial detection can be much lower than that associated with the temporal detection. Conventional detection with the aid of a photodiode followed by a transimpedance circuit does not allow such good sensitivity as an imager (matrix spatial detector). The presence of the imager allows excellent alignment of the laser emission toward the target: the divergence of the telemetry beam can therefore be reduced. This has the advantage of increasing the illumination of the target and therefore of providing a stronger echo. Thus there is a gain in the sensitivity of the detection of the echo and a strengthening of the echo. It follows therefrom that for one and the same laser source and one and the same diameter of the reception optics the telemetry range is significantly increased.

The imager can furthermore provide deviometry parameters of the target so as to allow fine pursuit of the target.

The direction can be determined in passive mode and the first distance slice can be determined in active mode by the following sub-steps:

Choosing of an initial integration period defined by a predetermined temporal position and a maximum duration of integration determined by daytime operation, corresponding to a distance slice, Scanning of a distance domain predetermined by telemetries, on the basis of the initial integration period and in adjacent successive integration periods of the same duration of integration, the first integration period during which an echo is detected determining the first distance slice in which the target is situated.

The direction and the first distance slice can be determined simultaneously and in active mode.

In the course of the successive iterations, the integration periods are advantageously established by taking into account a predetermined overlap related to a low sensitivity of the detector at the start of the duration of integration.

When the target has a relative speed, in the course of the successive iterations, each integration period is preferably established by taking into account the relative speed of the target.

According to a characteristic of the invention, the variations of the position of the integration period are obtained by dichotomies of the position of the integration period in the course of the successive iterations, the third distance slice being determined on the basis of the integration period of the last iteration.

According to another characteristic of the invention, the target has a constant relative speed which is unknown but lies between a predetermined minimum approach speed and a predetermined maximum speed of recession, and the reduction in the second distance slice is obtained in the course of the successive iterations with at each telemetry:

a random variation of the position of the integration period according to a direction, the direction of variation reversing as soon as there is a first absence of echo detection according to an integration period with detection, when an echo has been detected, a recording of the date of emission of the pulse and of the position of the corresponding integration period, a calculation of a minimum speed straight line and of a maximum speed straight line on the basis of the dates and positions recorded, the relative speed of the target being between the slope of the minimum speed straight line and the slope of the maximum speed straight line, and at any instant, the third distance slice being between the minimum speed straight line and the maximum speed straight line.

The subject of the invention is also a computer program product, said computer program comprising code instructions making it possible to perform the steps of the method of measuring distance of a target such as described, when said program is executed on a computer.

The invention also relates to a system for measuring distance of a target which comprises:

a pulse emitter, a matrix detector comprising spatial mini-detectors coupled to capacitors whose duration of integration is controlled by a polarization of the mini-detectors, means for orienting the emitter and the detector, a processing unit able to synchronize the emitter and the detector, to control the orientation means and to implement the method such as described.

BRIEF DESCRIPTION OF THE DRAWINGS

Other characteristics and advantages of the invention will become apparent on reading the detailed description which follows, given by way of nonlimiting example and with reference to the appended drawings in which.

DETAILED DESCRIPTION

From figure to figure, the same elements are tagged by the same references.

Figure 1:
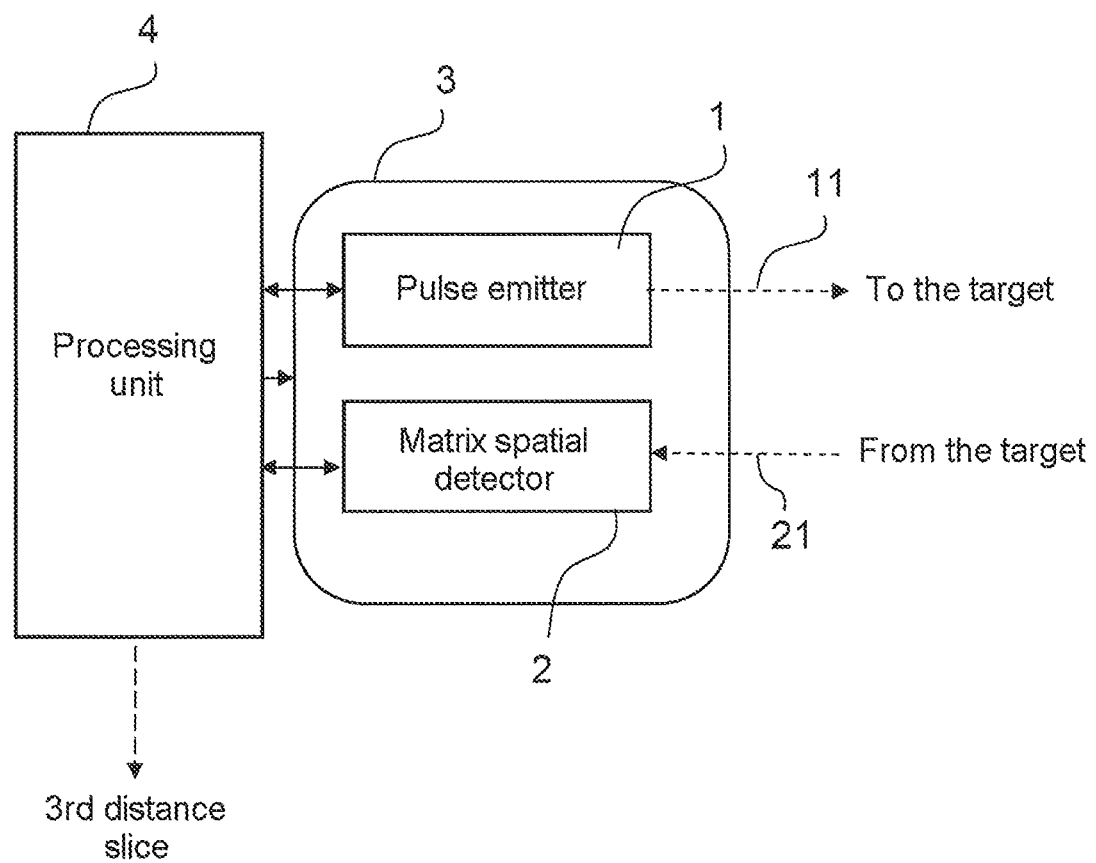
FIG. 1 schematically represents an exemplary distance measuring system according to the invention, FIG. 2 schematically illustrates the sensitivity of a matrix detector with capacitor as a function of time.

The distance measuring system according to the invention described in conjunction with FIG. 1, comprises:

an emitter 1 of laser pulses 11, a matrix detector 2 (also referred to as imager) allowing the spatial detection of the image 21 of the target in passive mode and/or of the echoes 21 of the target in active mode, a spectral filter placed in front of the receiver and centered on the wavelength of the laser so as to reduce the daytime optical flux and favor the detection of the echoes; it is optionally retractable, means 3 for orienting the emitter and the receiver in the direction of a target to be telemetered; the angular field in which the target lies is for example of the order of a milliradian, a processing unit 4 connected to the emitter, to the detector and to the orientation means and able to implement the method described hereinafter.

The present invention may be implemented on the basis of hardware and/or software elements. It may be available in the guise of computer program product on a medium readable by the processing unit. The medium may be electronic, magnetic, optical, electromagnetic or be a dissemination medium of infrared type. Such media are for example, semi-conductor memories (Random Access Memory RAM, Read-Only Memory ROM), tapes, magnetic or optical diskettes or disks (Compact Disk-Read Only Memory (CD-ROM), Compact Disk-Read/Write (CD-R/W) and DVD).

In a conventional telemetry system, the sensitivity of the receiver is optimized by satisfying good temporal precision of the detection so as to obtain distance precision such as metric precision for a target situated more than 100 m away. The receiver converts the light backscattered by the target into electrons. This receiver is mounted in a transimpedance circuit which converts the flux of electrons into a variable voltage. The variation of the voltage is representative of the variation of the light flux arriving at the receiver. Thus the date of arrival of the echo (=pulse emitted by the emitter, backscattered by the target and arriving at the receiver) can be precisely detected. The sensitivity is limited by the noise of the transimpedance circuit. Good temporal tagging requires a wide passband of several MegaHertz. This wide passband is one of the main sources of noise limiting the sensitivity of the receiver.

Customarily, spatial detectors are assembled as a matrix whose elements are spatial mini-detectors. Each spatial mini-detector is coupled to a capacitor. The duration of integration of the spatial mini-detectors is controlled by the polarization of the mini-detectors. When a light flux reaches a mini-detector each photon is converted into electron(s)

which is (are) drained toward the capacitor by virtue of the polarization of the mini-detector.

The distance measuring system according to the invention does not comprise any receiver mounted as transimpedance circuit, but a matrix detector whose spatial mini-detectors are coupled to capacitors whose duration of integration is controlled by the polarization of the mini-detector.

Figure 2:
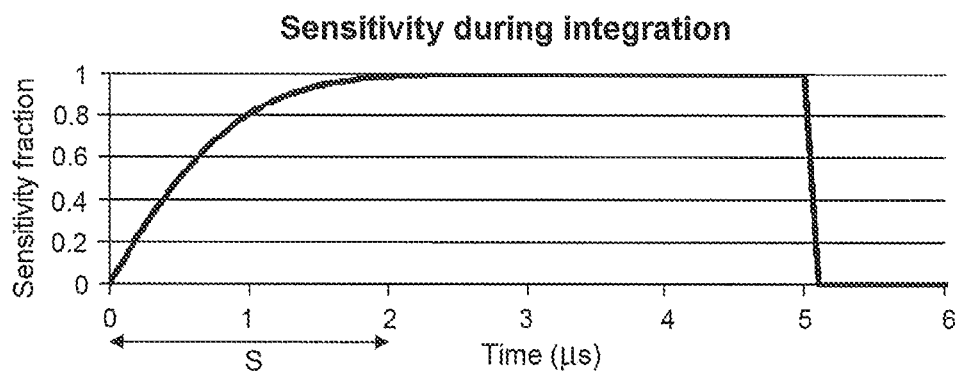

With this matrix detector, the efficiency of conversion of the photons into electrons is not one. It depends on the technology of the mini-detectors. At the start of the integration period, the quantum efficiency is not at its maximum. A weak echo might not be detected whilst the same echo, later with respect to the start of the integration period, will be correctly detected. During the establishment of the polarization at the start of the duration of integration for a duration S, the sensitivity of the mini-detectors is therefore not optimal, as shown in FIG. 2. The duration S of this lesser efficiency depends on the detection circuits. Thus the duration of the integration period cannot be reduced to values of less than S, in this instance a few microseconds in our example. Neither can this start of detection period be neglected since a strong signal although attenuated will be detected. A similar phenomenon but of much shorter duration also takes place at the end of the integration period.

Optionally, it is also possible to take account of the total duration of the emitted pulse. The echo has a temporal width at least as wide as that of the emitted pulse. If the sensitivity were uniform over the whole duration of the integration it would be necessary to take account at each end of a partial integration of the pulse: indeed, part of the energy of the pulse might arrive too early or too late. The effect is similar to the reduction in sensitivity at the start of the integration period. The duration of overlap required in order to take account of the width of the pulse is typically four times the width (temporal) at mid-height of the emitted pulse, in order to be certain that the integration is always active throughout the duration of the echo.

An integration period is defined by a duration of integration and a position of the integration period in relation to the emission of the laser pulse, such as for example the start of the duration of integration.

In our example, the effects of sensitivity variation at the start of the integration period and the effect of the width of the pulse are included in the 2 μs of overlap.

For the description, 5 μs is taken as an example of total minimum duration of the integration period. At the start of the integration period a portion of 2 μs is presumed to be less sensitive.

Next, after the end of the duration of integration, the mini-detector reading circuit empties the capacitor in order to quantify the number of electrons. A phenomenon similar to that of the start S of the integration, but of much shorter duration, also takes place at the end of the integration period. Parasitic phenomena are also a source of noise.

The noise level associated with the spatial detection may be much lower than that associated with the temporal detection. The sensitivity of the spatial detection may therefore be markedly better than that of the temporal detection. This is the consequence of the low temporal resolution.

To profit from the possibility of better performance of the spatial detection with respect to that of the temporal detection, on long-range targets, typically a distance of more than 100 m away, the method according to the invention uses only spatial detection to provide a distance and applies especially when the return provided by the target is assumed to be insufficient for temporal detection to be able to operate.

The method according to the invention mainly comprises the following steps.

A) Determination of the direction of the target with respect to a known direction of the emitted pulses, and of a first integration period determining a first distance slice in which the target is situated, B) Reduction of the first distance slice in the course of successive telemetry iterations by dichotomies of the duration of integration and until a predetermined minimum duration of integration is reached, a second distance slice in which the target is situated, and included in the first distance slice, being determined on completion of this step, C) Reduction of the second distance slice in the course of successive telemetry iterations carried out by variations of the position of the integration period, with constant durations of integration, a third distance slice in which the target is situated, and included in the second distance slice, being determined on completion of this step.

The distance of the target can vary in the course of time on account of the combined speeds of the system and of the target, or more precisely on account of the projections of the speed vectors of the system and of the target on the straight line connecting the system to the target. In general under such conditions this relative speed is not known. For each step, two cases are considered.

1. The case where the relative speed is precisely known, possibly zero.
2. The case where the relative speed is not known precisely but belongs to a known domain of speeds.

For a target with precisely known relative speed Vr.

If the target is receding, its relative speed is positive: from pulse to pulse the distance increases.

If the target is approaching, its relative speed is negative: from pulse to pulse the distance decreases.

For a pulse repetition at a frequency Fr (in Hz), from pulse to pulse, the distance traveled by the target is manifested by an additional delay of arrival of the echo. Let T be this additional delay:

$$\tau = \frac{Vr}{\frac{c}{2} \cdot Fr}$$

For a target with unknown relative speed, the target can recede with a positive maximum speed $V_{max}$. The target can also approach with a negative minimum speed $V_{min}$.

For a pulse repetition at a frequency Fr (in Hz), from pulse to pulse, the distance traveled by the target is manifested by a complementary delay of arrival of the echo which decomposes into two values:

The positive delay μ corresponding to the influence of the maximum speed for a pulse repetition frequency Fr.

$$\mu = \frac{V_{max}}{\frac{c}{2} \cdot Fr}$$

The negative advance γ corresponding to the influence of the minimum speed for a pulse repetition frequency Fr.

$$\gamma = \frac{V_{min}}{\frac{c}{2} \cdot Fr}$$

At each iteration, γ is added at the start of the integration and μ is added at the end of the integration. This corresponds to a widening by μ–γ of the integration period with respect to the situation without relative speed of the target.

The description which follows details each step. The incidence of the relative speed is specified. The description is illustrated by examples.

A) Determination of the Direction of the Target and of a First Distance Slice.

Telemetry does not always allow spatial detection of the target without the aid of emission, as is generally the case at night when the target's own emission is not detectable in the spectral band of the spatial detector. Operation without the aid of emission, which is referred to as passive mode, is therefore differentiated from operation with the aid of emission, which is referred to as active mode. The target can have its own emission in the spectral band of the spatial detector, on account of its temperature being perceivable by the spatial detection.

When the ambient illumination or the target's own emission are insufficient to allow passive detection, the direction of the target is determined in active mode. The mode is termed active agent when the spatial detection perceives the target illuminated by a laser pulse. The passive emission of the target is weak and the duration of integration can be chosen to cover the whole expected distance domain of the system.

The distance-wise performance depends on the orientation of the axis of the emission in the direction of the target. At night there is no limitation of the field of the mini-detectors (the unitary field of the mini-detectors and the divergence of the beam emitted can be large), or of the integration period for the unitary field of the spatial detection; this duration can correspond to a distance slice of several tens, or indeed hundreds of kilometers. A search for the presence of the target by scanning the target's probable cone of presence is possible using a duration of integration covering the whole distance domain covered by the measuring system.

There is a compromise to be made between on the one hand the instantaneous field (divergence) of the emission and therefore of the limit range, and on the other hand the time for exploration by emission of successive pulses in the direction of the possible field where the target is situated.

On completion of this step and whatever the relative speed of the target, the distance of the target has been tagged in a very large distance slice also referred to as the 1st distance slice. As indicated, this 1st distance slice may cover several tens, or indeed hundreds of kilometers.

The direction can be determined in passive mode. The mode is termed passive when the spatial detection perceives the target such as illuminated by the ambient illumination or by the target's own emission, that is to say without it being necessary to illuminate it with a laser pulse. Spatial detection in passive mode makes it possible to locate the target and to provide the orientation means with the information necessary for the alignment of the axis of the emission of the pulses with the target.

The goal of the spatial detection in passive mode is to refine the pursuit by providing precise deviometry between the direction pointed at by the system and the perception of the target by the spatial detector 2. The spectral filter placed in front of the detector can be retracted during the passive mode to favor detection. If it is not retracted the duration of integration must be long enough to perceive the target with the ambient illumination alone and despite the spectral filtering. The duration of the integration period may be several milliseconds.

Subsequent to the passive detection, the deviometry of the target with respect to the direction of the emission allows the adjustment of the direction of emission of the telemetry in the direction of the target. The residual deviometry must be smaller than the emission divergence.

The direction of the target can also be determined in passive mode by another device dedicated to this function and fitted to the system, such as a specific deviometer or a camera which will have to be cognizant of the direction of emission of the telemeter.

The quantization of the signal perceived in passive mode by the spatial detection serves as measurement of the background flux created by the illumination of the target by the ambient daylight or by the target's own emission.

The direction of the target being thus determined in passive mode, a first distance slice in which the target is situated is searched for in active mode. Indeed, the goal of this spatial detection in active mode is initially to determine in a coarse manner the distance of the target by having a spatial detection in a predetermined integration period.

In the case where detection of the target in passive mode is possible, the passive flux collected over the maximum integration duration corresponding to the range of the system, may be too considerable to allow optimal detection of the target. For this step, the duration of integration of the spatial detection is as large as possible allowing discernment of the echo of the target illuminated by a pulse, despite the background flux created by the illumination of the target by the ambient daylight or by the target's own emission. The background flux is a continuous flux. The signals perceived of the background flux by the spatial mini-detectors are proportional to the duration of the integration period. It is indeed recalled that the photons arriving at the detectors accumulate in the course of the integration period. The echo of the target (of short duration) may then be drowned in the background signal when the duration of integration is too long. It follows therefrom that the daytime ambient illumination in which the echo may rapidly be drowned, is distinguished from the low nighttime ambient illumination in which the echo may be detected over very long durations. The position of the target on the spatial detectors is known. The calculation of the background flux level not to be exceeded in order to be able to detect with a given false alarm rate and a given probability of detection, a minimum level of echo of the target illuminated by the pulse, is of the known prior art. In the phases where the duration of integration is reduced, the background flux detected will be reduced, and the detection threshold will be able to be decreased while preserving the same false alarm rate in order to increase the probability of detection.

Conversely the echo cannot be detected if it is outside the integration period. A compromise relating to this integration period (defined by a duration of integration and the position of this duration, the start for example) is determined as a function of the ambient illumination, of the sensitivity of the detector, of the noise of the detection chain, of the minimum level of the echo to be detected, etc.

Figure 3:
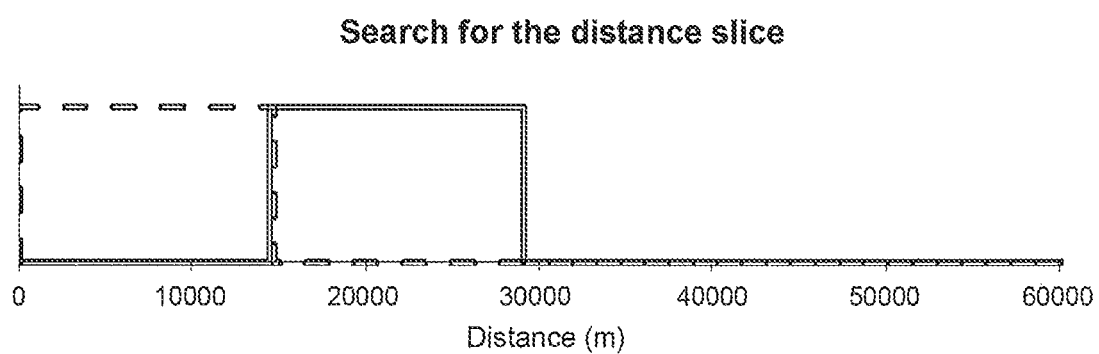
FIG. 3 illustrates a step of searching for a 1st large distance slice, of the method according to the invention.

As illustrated in FIG. 3, the distance domain covered by the measuring system will be examined by distance slices of equal lengths, this length corresponding to the "largest possible" duration of integration indicated hereinabove. The goal is to detect in which distance slice the target lies. As a function of its distance from the telemeter, the echo of the target will return with a delay of 6.67128 μs/km (Return journey of light propagating at 299792458 m/s). For ease of reading in the examples where there is simultaneous presentation of the time and of the distances, 1 µs represents 150 m of distance instead of 149.896229 m in vacuo.

A target situated 15175 m from the system is taken as example. The longest duration of integration which nonetheless makes it possible to discern the echo of the ambient illumination, or stated otherwise which allows active discernment of the target, is 98 µs, this representing a distance slice 14700 m in length. Beyond this duration of integration, the echo may be drowned in the ambient illumination.

The target possibly being threatening, the successive distance slices will be examined by increasing distance. But the method also applies on examining them by decreasing distances.

In the case where the relative speed is zero, to ensure exploration of the distance domain with optimal sensitivity, it is necessary to neutralize the moment at which the sensitivity is not optimal at the start S of the integration period.

Here is the algorithm for positioning the integration period.

For the determination of the first distance slice, the active mode uses the same integration period of width P.

Let $D_0$ be the delay of the start of the first integration period corresponding to the shortest distance expected by the system. Let $F_0$ be the delay of the end of this first integration period. The integration period has the same width (or duration) P during this step.

$$F_0 = D_0 + P$$

If there is no detection and the maximum distance of the system is not reached, a new integration period is positioned for the following pulse. Account must be taken of the duration of lesser sensitivity of the start of the integration period S.

$$D_1 = F_0 - S$$
$$F_1 = D_1 + P$$
$$\ldots$$
$$D_i = F_{i-1} - S$$
$$F_i = D_i + P$$

This process is continued until there is a detection or until the delay corresponding to the maximum distance is reached. In this case the target is momentarily not detectable and the process is resumed from the start.

As soon as there is a detection in an integration period, a new step is begun.

As indicated previously, the spatial detection is less sensitive at the start of the duration of integration for a duration S, in our example, this is the first 2 µs (S=2 µs).

The successive integration periods must therefore preferably overlap by this duration S, thus corresponding for the successive distance slices to an overlap of length Ls (S=2 µs→Ls=300 m in our example).

The position of the first integration period is predetermined by the system: when there is no expectation of a target to be telemetered at very short distance the first distance slice might not begin at 0 m but at a few tens or hundreds of meters, depending on the applications. In our example, detection begins with an integration period starting at t=0.

There is no echo detection in this first integration period which corresponds to a first distance slice from 0 to 14700 m, represented in FIG. 3 with dashes. There is no reason to take account of the lower sensitivity during the 2 µs of start of the integration period since if the target is less than 300 m away the echo will be strong.

Subsequent to the second emission of a pulse, the integration period begins with a delay of 96 µs (=98 µs−2 µs). Indeed, to guarantee a search for the target with full sensitivity, the first S seconds (S=2 µs) of the period overlap with the end of the previous integration period. This corresponds to an overlap Ls of 300 m. This integration period corresponds to the distance slice from 14400 m (=14700−300) to 29100 m (=14400+14700). In our example an echo is detected in this integration period since the target is 15175 m away: the target is therefore in the corresponding distance slice.

In telemetry there are customarily two types of logic, depending on the nature of the targets sought: either a first-echo logic, or a last-echo logic. According to the invention based on an imager which allows detection, the profile of what has contributed to the detection is available. Either what is detected in the distance slice is what is expected and in this case there is no reason to search in other distance slices. Or what is detected is not what is expected and in this case the method continues for the following slices all of the same length (14700 m in our example) according to the same principle as described previously: the 3rd distance slice will cover the distances lying between 28800 m (=29100−300) and 43500 m (=28800+14700), etc., until an echo is detected in a distance slice or until the range limit of the system is reached.

On completion of this step, the target has been tagged in a large distance slice also referred to as the 1st distance slice. In our example this is the distance slice lying between 14400 m and 29100 m.

When the speed of the target is precisely known, it is also necessary to take into account the additional delay $\tau$.

For the determination of the first distance slice, the active mode uses the same integration period of width P.

Let $D_0$ be the delay of the start of the first integration period corresponding to the shortest distance expected by the system. Let $F_0$ be the delay of the end of this first integration period. The integration period has the same width P during this step.

$$F_0 = D_0 + P$$

If there is no detection and the maximum distance of the system is not reached, a new integration period is positioned for the following pulse. It is necessary to take account of the duration of lesser sensitivity of the start of the integration period S.

$$D_1 = F_0 - S + \tau$$

$$F_1 = D_1 + P$$

This process is continued until there is a detection or until the delay corresponding to the maximum distance is reached. In this case the target is not momentarily detectable and the process is resumed from the start.

When the speed of the target is not precisely known, it is also necessary to take into account the possible speed domain.

Let $D_0$ be the delay of the start of the first integration period corresponding to the shortest distance expected by the system. Let $F_0$ be the delay of the end of this first integration period. The integration period has the same width P+µ-γ during this step.

$$F_0=D_0+P+\mu-\gamma$$

If there is no detection and the maximum distance of the system is not reached, a new integration period is positioned for the following pulse. It is necessary to take account of the duration of lesser sensitivity of the start of the integration period S.

$$D_i=F_{i-1}-S+\gamma$$

$$F_i=D_i+P+\mu-\gamma$$

This process is continued until there is a detection or until the delay corresponding to the maximum distance is reached. In this case the target is not momentarily detectable and the process is resumed from the start.

As soon as there is a detection in an integration period, a new step (step B) is begun. The first distance slice is known corresponding to the domain covered by the detection period. The first distance slice corresponds to the detection period extending from $D_{i-1}$ to $F_{i-1}$.

On completion of this step, the target has been tagged in a large distance slice also referred to as the 1st distance slice.

B) First Reduction of the Distance Slice in which the Target is Situated, by Dichotomies of the Duration of Integration.

Figure 4:
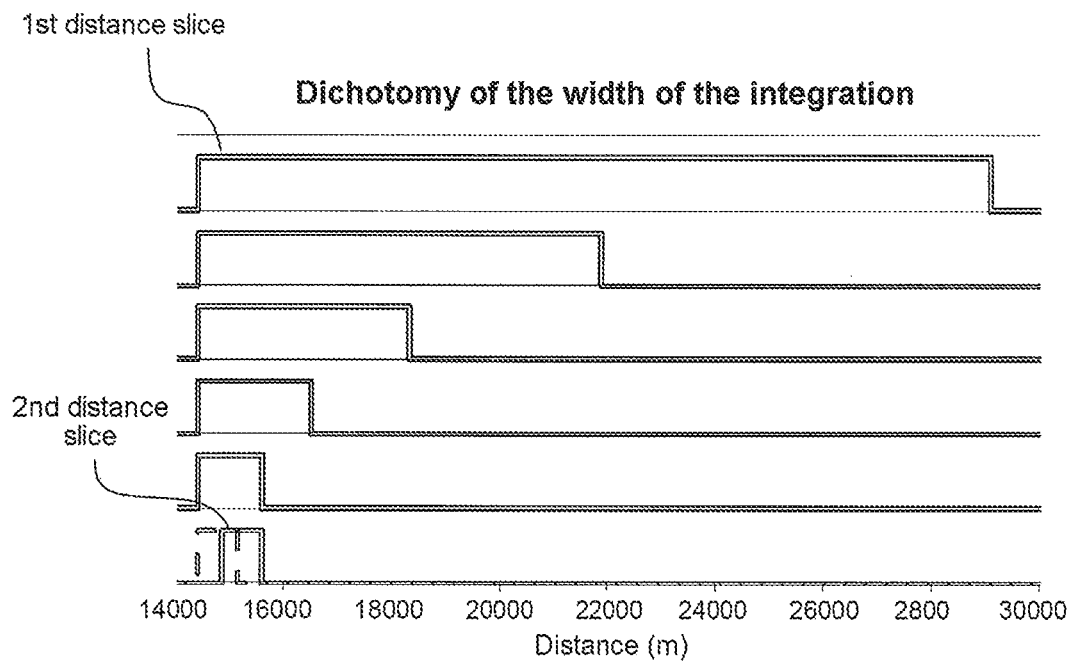
FIG. 4 illustrates a step of first reduction of the distance slice, of the method according to the invention.

This step will make it possible to refine the distance of the target within this 1st slice, by reducing the duration of the integration period while verifying that the echo of the target is properly present, as illustrated in FIG. 4.

A dichotomy of the duration of the integration period will make it possible to reduce it down to a predetermined minimum duration allowed by the technology of the detector and by the means for synchronizing the emission and the delay of the integration period.

A zero relative speed is firstly considered.

In principle, after the detection of the echo has occurred in an integration period with a given delay, the next telemetry is carried out with the same delay for the start of the integration (preferably adjusted to take into account the duration S of low sensitivity) but with a duration of integration reduced by half: this corresponds to the 1st half (preferably adjusted) of the 1st distance slice. If there is no echo detection over this duration of integration, the following telemetry is carried out on the other half of this initial integration period, which corresponds to the 2nd half of the 1st slice. In our example an echo is detected in the first half of the integration period.

This dichotomy is repeated by decreasing the duration of the previous integration period by half (or about a half as will be specified further on), at each iteration; when an echo of the target is detected in the first half, we pass to the following iteration as is the case for the first 4 iterations of FIG. 4, otherwise it is verified that an echo is obtained in the other half before passing to the following iteration as is the case for the 5th iteration of FIG. 4. Thus by successive iterations, the width of the duration of integration is reduced and the corresponding integration period is retained insofar as an echo of the target is detected therein. The length of the distance slice is ultimately narrow.

Preferably, account is taken of the start S of the integration period during which the spatial detection is less sensitive.

The previous detection took place for an integration period 98 µs wide beginning with a delay of 96 µs on the emission of the pulse. In our example, this integration period corresponds to the distance slice from 14400 to 29100 m.

The first division of the duration of integration DI is carried out with a duration of integration of 50 µs beginning with the same delay as previously, i.e. 96 µs after the emission of the pulse.

The successive durations of integration $DI_i$ are calculated in the following manner, taking account of the necessary overlap:

$$DI_i = \frac{(DI_{i-1} + S)}{2}$$

The position of the integration period i+1 is set in the following manner:

At the ith iteration a first detection test extends from $D_i$ to $F_i$ and if there is no detection, a second test is done with an iteration extending from $K_i$ to $L_i$. The iterations of the two tests overlap by the duration S of lower sensitivity.

For the first telemetry trial i=0

$$D_i=D_{i-1}$$

$$F_i=D_i+DI_i$$

If there is detection at this first test, the new slice in which the target lies is:

Start: $Td_i=D_i$ End: $Tf_i=F_i$

If there is no detection at the first test, a second test is done for this iteration.

The start of the integration takes place at $$K_i=F_i-S \text{ and } L_i=K_i+DI_i$$

The calculation of the new slice locating the target takes account of the non-detection in the first test of this iteration.

Start $Td_i=F_i$ End: $Tf_i=L_i$

Thus the width of the distance slice reduces by half at each iteration.

When dealing with the first "half" of the period i, the start of the period i+1=the start of the period i, or stated otherwise the lower limit of the distance slice i+1=the lower limit of the distance slice i;

When dealing with the second "half" of the period i, the end of the period i+1=the end of the period i, or stated otherwise the upper limit of the distance slice i+1=the upper limit of the distance slice i.

In our example, with an overlap of 2 µs, the successive widths of duration of integration are: 98, 50, 26, 14, 8 and 5 µs. The duration of the integration cannot be reduced infinitely. Since as previously explained there are physical limitations at the level of the imager and there is also the effect of the temporal width of the emitted pulse.

In our example with a target 15175 m away, the dichotomy of the width of the duration of integration for the values indicated hereinabove corresponds to the distance slices:

from 14400 to 29100 m, of length 14700 m,
from 14400 to 21900 m, of length 7500 m,
from 14400 to 18300 m, of length 3900 m,
from 14400 to 16500 m, of length 2100 m,
from 14400 to 15600 m, of length 1200 m,
from 14400 to 15150 m, of length 750 m, but there is no echo detection, therefore the following slice is from 14850 to 15600 m of the same length 750 m and set on the upper limit of the previous distance slice (14400-15600 m).

The graphical representation is shown in FIG. 4: the distance slice when there is no detection is drawn dotted.

According to an alternative, these dichotomies can be carried out by considering the 2nd half, before the 1st half.

On completion of this step B with a zero relative speed, the target is located in a distance slice termed the 2nd distance slice, included in the 1st distance slice and narrower than the latter.

In the case where the relative speed is known, the duration of integration DI evolves in the same manner.

$$DI_i = \frac{(DI_{i-1} + S)}{2}$$

But at each iteration the starts and ends of integration slip on account of the speed.

$$D_i = D_{i-1} + \tau$$

$$F_i = D_i + DI_i$$

If there is detection at this first test, the new slice in which the target lies is:

Start: $Td_i = D_i$ End: $Tf_i = F_i$

If there is no detection at the first test, a second test is done for this iteration.

The start of the integration takes place at $$K_i = F_i - S + \tau \text{ and } L_i = K_i + DI_i$$

The calculation of the new slice locating the target takes account of the non-detection in the first test of this iteration.

Start $Td_i = F_i + \tau$ End: $Tf_i = L_i$

Thus the width of the distance slice reduces by half at each iteration.

When the speed of the target is not precisely known, it is also necessary to take into account the possible domain of speeds.

$$DI_i = \frac{(DI_{i-1} + S + 2 \cdot (\mu + \gamma))}{2}$$

At the first test $$D_i = Td_{i-1} + \gamma$$

$$F_i = D_i + DI_i$$

If there is detection at this first test, the new slice in which the target lies is:

Start: $Td_i = D_i$ End: $Tf_i = F_i$

If there is no detection at the first test, a second test is done for this iteration.

$$K_i = -S + \mu \text{ and } L_i = K_i + DI_i$$

Start $Td_i = F_i + \mu$ End: $Tf_i = L_i$

The process of reducing the width of the integration period stops when the minimum width of the window envisaged for the system is reached.

On completion of this step B with a non-zero relative speed, the target is located in a distance slice termed the 2nd distance slice, included in the 1st distance slice and narrower than the latter.

We shall illustrate by an example this case of first reduction of the distance slice of the target with relative speed, by dichotomies of the duration of integration.

A 1st distance slice has been determined on completion of step A, by introducing a further overlap related to the speed, as has just been described.

It is considered in our example that there has been detection in the distance slice from 39030 m to 78030 m (=1st distance slice), i.e. an integration covering the delays from 260.2 μs to 520.2 μs. Just as for a fixed-distance target, along with the iterations, the distance slice is split into half-slices, while taking account of the duration for obtaining full performance during the integration. But as the target now has a relative speed, the splitting into two half-distance slices also takes account of this speed. Thus to remain with balanced half-slices, the effect of the overlap required because of the unknown speed of the target when approaching or when receding, and of the duration for obtaining full performance during the integration is split between the two half-slices. Let M be the middle searched for of the previous slice of duration D. The first half-slice must begin 0.8 μs earlier to take account of the possibility of the target approaching and terminate at M. If there is no detection the start of the other half-slice must begin 2.8 μs earlier than M to mask the 2 μs of lesser sensitivity and to take account of the possibility that the target is approaching. The end of this half-slice must be the end of the slice of last detection, increased by 2 times 0.2 μs to take account of the speed of recession of the target since the last detection.

The slice of duration D is therefore decomposed into two half-slices of the same duration: (D+0.8+2.8+0.4)/2=(D+4)/2=D/2+2.

The duration of these half-slices is therefore increased by 2 μs (600 m) in our example.

For the following pulse, the first half-slice considered will be the closest. The target has moved. The fact that the echo may be strong at the start of the integration period where it is intrinsically weak, is already taken into account in the start of the integration period (at 259.2 μs in our example). The integration of half duration must take the speed aspect into account. To take these phenomena into account and remain with balanced half-slices, the start of the integration period is at 260.2−0.8=259.4 μs (39030−120=38910 m).

the duration envisaged is 260/2+2=132 μs (39000 2+300=19800 m).

the end of the period is at 259.4+132=391.4 μs (38910+19800=58710 m).

If there is detection the same reasoning is made for a new splitting of the duration of the integration, with a start of integration at 259.4−0.8=258.6 μs (38910−120=38790 m)

a duration of integration of 132/2+2=68 μs (19800/2+300=10200 m), an end of integration at 258.6+68=326.6 μs (38910+10200=49110 m).

| | Start slice | End of slice | Width of slice | Detection |
| --- | --- | --- | --- | --- |
| 1st | 39030 m | 78030 m | 39000 m | Yes |
| 2nd | 38910 m | 58710 m | 19800 m | Yes |
| 3rd | 38790 m | 48990 m | 10200 m | |

If there is no detection, the start of the following period must be set to the end of the previous period advanced by the 2 µs of lesser sensitivity and by 0.8 µs to take account of the maximum speed of approach of the target i.e.:

391.4−0.8−2=388.6 µs (58710−120−300=58290 m).

For the end of the integration period, account is taken of the relative speed of the target in the form of a recession, i.e. 300 m/s between 3 successive pulses (there has not been any detection for the 2nd pulse) at 10 Hz, i.e. 60 m or +0.4 µs; thus the end will be 520.2+0.4=520.6 µs (78030+60=78090m).

|     | Start slice | End of slice | Width of slice | Detection |
| --- | --- | --- | --- | --- |
| 1st | 39030 m | 78030 m | 39000 m | Yes |
| 2nd | 38910 m | 58710 m | 19800 m | No |
| 3rd | 58290 m | 78090 m | 19800 m | Yes |

The subdivision subsequent to this third pulse is thereafter done as previously.

Thus the durations of integration will be reduced by successive dichotomies with the reduction rules specified hereinabove. In our example, one obtains the durations of integration: 260, 132, 68, 36, 20, 12, 8, 6, 5 µs.

By this dichotomy method the knowledge of the position of the target in a fairly narrow distance slice is possible. But the duration of integration cannot be reduced to very short durations. On the one hand the uncertainty in the speed of the target imposes a minimum width from one detection test to the other. Moreover just as for a fixed-distance target, the characteristics of the spatial detection do not make it possible to drop below a minimum duration in order to have the best efficiency. It is possible to have for example a duration of 2×(0.8+0.2) µs because of the possible speed of the target and of 2 µs to reach the maximum detection efficiency. In this example a minimum duration of duration of integration of 5 µs (>2+2 µs) is chosen, i.e. a distance slice length of 750 m.

On completion of this step of first reduction, the target with relative speed is located in a narrower distance slice than the 1st distance slice, termed the 2nd distance slice.

C) Second Reduction of the Distance Slice in which the Target is Situated, by Dichotomies of the Position of the Integration Period.

Now it is no longer possible to reduce the width of the integration period. The method relies on controlled slippage of the position of the integration period in relation to the moment of emission of the laser pulse.

During this step, the duration of the integration is fixed and equal to the duration of integration minimum retained on completion of the previous step.

When the relative speed is known precisely and possibly zero, the refinement of the knowledge of the distance slice is done as follows.

$$F_i = Td_{i-1} + \frac{(Tf_{i-1} - DTd_{i-1})}{2} + \tau$$

$$D_i = F_i - P$$

If there is detection at this first test, the new slice in which the target lies is:

Start: $Td_i = Td_{i-1}$ End: $Tf_i = F_i$

If there is no detection at the first test, a second test is done for this iteration.

$K_i = F_i - S + \tau$ and $L_i = K_i + P$

And the new slice is

Start: $Td_i = F_i + \tau$ End: $Tf_i = Tf_{i-1} + 2 \cdot \tau$

The principle of this step is to shift the start of the integration by successive iterations. So as not to be limited by the portion S with lesser efficiency which is represented at the start of the duration of integration (i.e. the left part in the example), the latter is taken into account in determining the position of the integration period.

On the basis of the position of the integration period corresponding to the 2nd distance slice, this position is advanced (it starts earlier) by half the total width, although it is known that the echo will not lie in the 1st half of this integration period thus shifted.

If there is detection, the target is therefore located in a distance slice which is in fact half (preferably to within the overlap) as wide as that which one had with the 2nd distance slice. Indeed if there is detection, it is therefore in the 1st half (preferably to within the overlap) of the 2nd distance slice. The following integration period is then advanced but by half (preferably to within the overlap) the previous shift.

If there is no detection, it is because the target is situated in the other half (preferably to within the overlap) of the 2nd distance slice. But the refinement of the distance of the target relies only on effective detections. If subsequent to the emission of a pulse there is no detection, it is not possible to affirm that the target is present in the complementary integration window (the other half) since the aim line may be less well pointed at the target or the echo is in the start of the integration period where the detection is less effective. A check will be carried out. The integration period is therefore delayed so as to cover the 2nd half (preferably to within the overlap) of the 2nd distance slice, with an overlap introduced so that the less effective integration portion is superimposed on the previous duration of integration. Thus the possible domain of presence of the target is entirely covered, with maximum sensitivity.

On completion of this first dichotomy of the position of the integration period, the target is then located in a distance slice which is divided by two (preferably to within the overlap) with respect to the 1st distance slice.

Along with the successive dichotomies of the position, the length of the distance slice in which the target is located, is each time divided by two (preferably to within the overlap).

Figure 5:
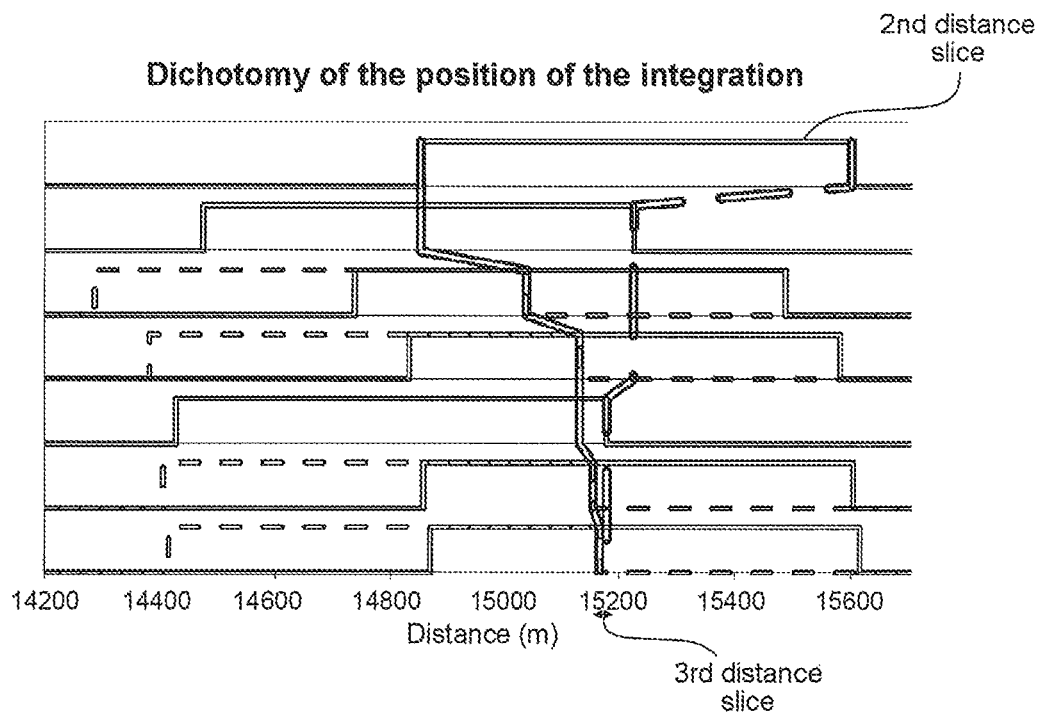
FIG. 5 illustrates a step of second reduction of the distance slice, of the method according to the invention.

In our example this minimum duration is 5 µs. With a zero relative speed, the following table, also illustrated in FIG. 5, of the successive telemetries, translated into distances, is obtained, in which the 1st distance slice inherited from the previous step is referred to as the initial telemetry:

| initial | start integration | end integration | detection | start distance slice | end distance slice | length of the distance slice |
| --- | --- | --- | --- | --- | --- | --- |
| telemetry |  |  |  | 14850 | 15600 | 750 |
| 1 | 14475 | 15225 | yes | 14850 | 15225 | 375 |
| 2 | 14287.5 | 15037.5 | no |  |  |  |
| 2 bis | 14737.5 | 15487.5 | yes | 15037.5 | 15225 | 187.5 |
| 3 | 14381.3 | 15131.3 | no |  |  |  |
| 3 bis | 14831.3 | 15581.3 | yes | 15131.3 | 15225 | 93.7 |
| 4 | 14428.1 | 15178.1 | yes | 15131.3 | 15178.1 | 46.8 |
| 5 | 14404.7 | 15154.7 | no |  |  |  |
| 5 bis | 14854.7 | 15604.7 | yes | 15154.7 | 15178.1 | 23.4 |

-continued

| initial | start integra- tion | end integra- tion | detection | start distance slice | end distance slice | length of the distance slice |
|---|---|---|---|---|---|---|
| 6 | 14416.4 | 15166.4 | no | | | |
| 6 bis | 14866.4 | 15616.4 | yes | 15166.4 | 15178.1 | 11.7 |
| 7 | 14422.3 | 15172.3 | no | | | |
| 7 bis | 14872.3 | 15622.3 | yes | 15172.3 | 15178.1 | 5.8 |

For a target with unknown relative speed, the distance measuring method is similar to that described previously while, however, introducing a widening representative of the possible domain of speeds of the target. The first distance slice corresponded to the detection period extending from $D_{D-1}$ to $F_{i-1}$.

At the ith iteration a first detection test extends from $D_i$ to $F_i$ and if there is no detection, a second test is done with an iteration extending from $K_i$ to $L_i$. The iterations of the two tests overlap by the duration S of lower sensitivity.

The goal is to tighten the distance slice in which the target is situated. The minimum duration of the period is P.

$$F_i = D_{i-1} + \frac{(Tf_{i-1} - D_{i-1} + \mu)}{2}$$

$$D_i = F_i - P$$

If there is detection at this first test, the new slice in which the target lies is:

Start: $Td_i = Td_{i-1}$ End: $Tf_i = F_i$

If there is no detection at the first test, a second test is done for this iteration.

The start of the integration takes place at $K_i = F_i - S + \gamma$ and $L_i = K_i + P$ The calculation of the new slice locating the target takes account of the non-detection in the first test of this iteration.

Start $Td_i = F_i + \gamma$ End $Tf_i = Tf_{i-1} + 2 \cdot \mu$

Thus the width of the distance slice is reduced at each iteration. But this reduction is limited by the speed domain.

This step has been described while advancing the position of the integration period when passing to the following iteration. According to an alternative this step can proceed while retreating this position.

The target may be approaching or receding. With an assumed maximum approach speed of $V_{min} = -1200$ m/s for example, for a predetermined duration (repetition frequency) of 100 ms for example between two laser pulses, the target will have approached by 120 m: an overlap of at least $\gamma = -0.8$ μs is necessary. The target may also recede with an assumed maximum speed of $V_{max} = 300$ m/s for example; then an overlap of $\mu = 0.2$ μs corresponding to a distance of 30 m is necessary.

The positioning of the integration period also takes account of the efficiency of detection as a function of the position of the echo in the integration period and if necessary of the pulse width of the emission and of the synchronization noise.

To facilitate the reading of the examples, the integration periods are translated into distance equivalents.

For example the first distance slice goes from 450 m to 39450 m, i.e. an integration period of 260 μs overlapping the delays with respect to the emission of the telemeter by from 3 μs to 263 μs. The spatial detection searches for whether the level of the signals is above a predetermined threshold to detect the presence of the target.

For the first integration period there is no reason to take account of the duration S of lower sensitivity of the detectors since the echo provided by a short-range target is strong.

If there is no detection during this period, for the emission of the following pulse the position of the integration period will be shifted to cover the following distance slice, taking account of the assumed speeds of the target between the pulses with detection.

For example for the following slice, the integration will have to be active from: 263−0.8−2=260.2 μs (39450−120−300=39030 m, where the −0.8 μs (−120 m) take account of the possibility of approaching at 1200 m/s at 0.1 s and the 2 μs (300 m) of the duration S of lesser sensitivity that must be masked), to: 260.2+259=519.2 μs (77880m).

If there is still no detection, a new, further away, distance slice is positioned according to the same principle.

Throughout this measurement method such as described, the maintaining of the direction of emission of the pulses in the direction of the target is critical, all the more so when the target has a relative speed. Spatial detections in passive mode by the same detector may be made between the spatial detections in active mode, to aid with the orientation of the aim line. Moreover if there is detection, an optimization of the direction may be done by centering the emission on the zone of the target having the largest contribution in respect of the echo. A deconvolution with the spatial distribution of the illumination at the target level makes it possible to refine the alignment. The knowledge of the deviation of alignment perceived between passive detection and active detection enhances the precision of the deviometry for pursuit subsequent to a detection in passive mode.

If the target is not small, this mode can be used to have a better spatial description of the target by making a scan in the direction around the first detection.

The monitoring of the direction of pointing in relation to a fixed reference frame allows the system to remain pointed at the target.

Two ways of refining the distance are proposed, by dichotomies of the position of the integration or by random drawing of the position of the integration.

C1: Second Reduction by Dichotomies of the Position of the Integration.

As already indicated, the refinement of the distance of the target relies only on effective detections.

For each pulse the effective delay of the integration period is precisely measured.

Subsequent to the last detection of the step of first reduction, the period in which the target will be can be predicted by taking account of the possible domain of speeds. Just as for the fixed-distance target, this period is split in two. The following period will cover only one of the two halves. The fact that the start of the integration period is less effective must be taken into account to avoid missing the target and risking losing it.

For example the last detection took place for a period extending from 270 to 275 μs of delay on the moment of the emission of the pulse.

For the following pulse the target may be in the interval

270−0.8=269.2 μs and 275+0.2=275.2 μs i.e. 6 μs wide.

To refine the distance, the 6 µs of deviation are split in two. The detection period is positioned from 267.2 to 272.2 µs.

If there is detection, the target is therefore in the common slice between what was possible [269.2–275.2] and what is tested [267.2–272.2], i.e. the new slice [269.2–272.2].

If there is no detection, it is assumed that the target is in the complementary part [272.2–275.2]. At the following pulse, this complementary part where the target ought to be becomes [271.4–275.4]. A detection test is done [268.4–273.4]

If there is detection, the target is therefore in the common part [271.4–273.4]

If there is no detection, it is assumed that the target is in the complementary part [273.4–275.4].

When the relative speed of the target is not known, the process converges slowly because of the widening at each step of the probable zone where the target lies, which competes with the dividing of the width of the probable zone. This process does not make it possible to afford fine knowledge of the distance to better than the widening at each step. In the example the knowledge is limited to 1 µs i.e. 150 m.

An alternative is proposed to refine the distance and furthermore ascertain the relative speed of the target.

C2: Second Reduction by Random Drawing of the Position of the Integration Period.

As already indicated, it is not possible to reduce the duration of integration beyond a certain value to improve the knowledge of the distance. But also the uncertainty in the relative speed of the target imposes a minimum width to preserve detections fairly often, otherwise the target is lost.

The principle of this step is to accumulate several detections for which the delay of the integration period is variable. After each detection, the processing compares the precise position of the integration period with the previous ones. The processing provides an estimation of the distance domain and speed domain of the target. These estimations become more and more precise as the detections proceed.

The principle of accumulating the detections relies on a random variation of the delay of the integration period with respect to the emission of the pulses.

For each emitted pulse, the magnitude of the random variation is obtained as the product of the duration of the integration period multiplied by a random number lying between 0 and 1. There is a new random number draw for each new magnitude. The series of random numbers may be prerecorded. The average value of the magnitude of the random variation is half the duration of the integration period. In order for the target not to escape, this average value of the magnitude translated into distance multiplied by the repetition frequency must be greater than the absolute value of the target extremal speed assumptions.

On the basis of the last detection of the step of first reduction, for the following pulse the delay of the integration period is equal to the previous delay decreased by the first random magnitude. If there is detection, the evolution of the delay is in the same direction i.e. a decrease in the delay of the second random magnitude. For the following integrations the evolution is in the same direction as long as there is detection.

If there is no detection, the direction of evolution of the delay reverses. It will therefore increase, each time with a new random delay magnitude. It retrieves a detection in a few pulses according to the successive amplitude of the delay magnitudes. The delay increasing, there are successive detections. The increase in the delay continues until the first absence of detection. This absence of detection triggers the reversal of the direction of evolution of the delay. The direction of evolution of the delay remains constant to retrieve detections. This cycle is repeated until the parameters (position, speed) are obtained with satisfactory precision.

Figure 6:
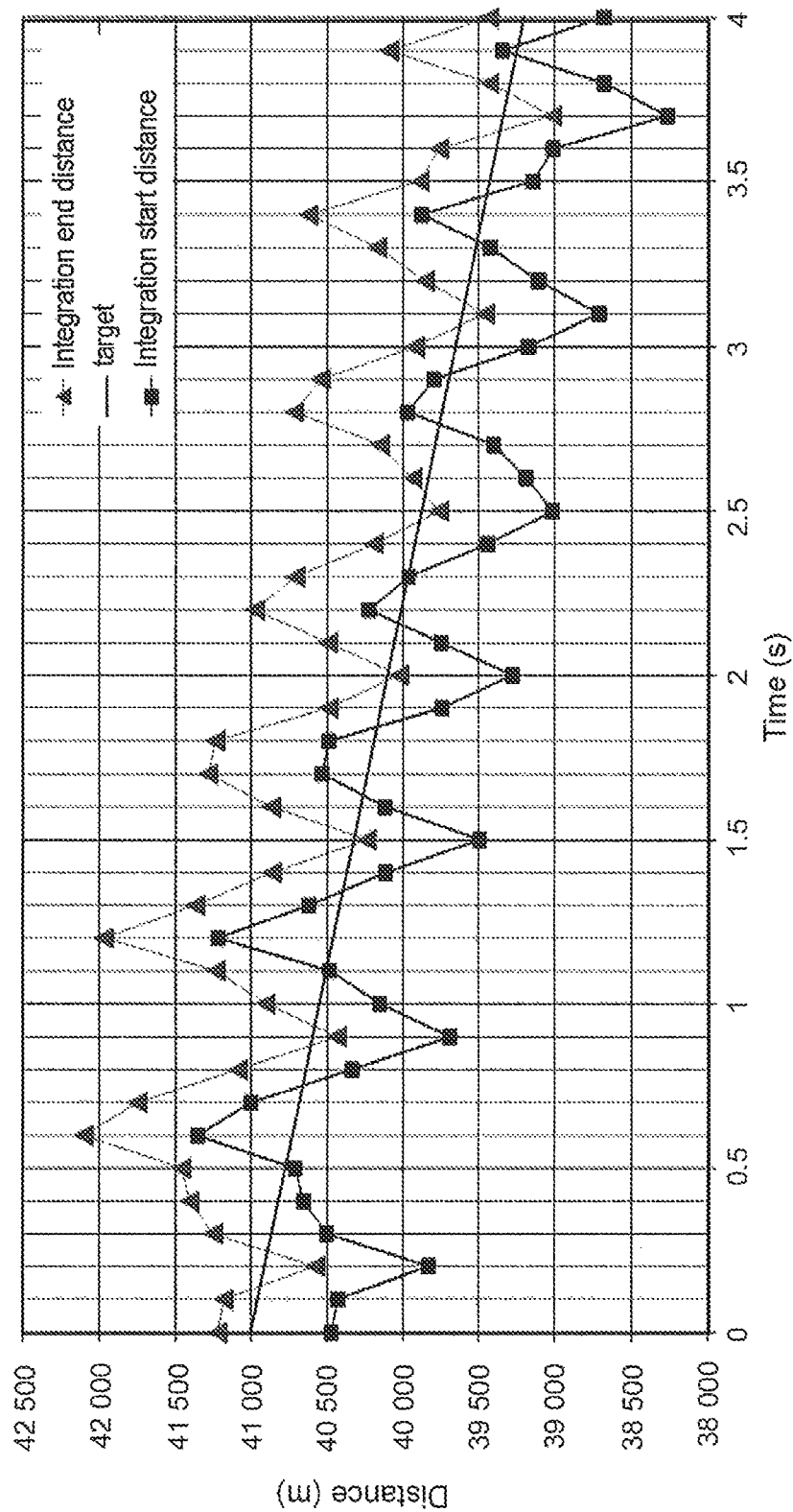
FIG. 6 represents a series of successive distance slices, corresponding to integration periods of the same length but of variable positions, as well as the trace of the target as a function of time.

A simulation of this step is illustrated in FIG. 6 on a target which at the instant denoted 0 is 41000 m away with a radial speed of −450 m/s, therefore approaching. There is emission of the pulses at 10 Hz.

The moment of each emission is dated. The position of each integration period in relation to the emission of the pulse is measured and recorded, while being associated with the date of emission of the pulse. The possibility of temporal noise affecting the position of the integration period does not affect the process of random variation of the displacement of the integration period provided that the effective value of the position is recorded precisely.

Figure 7:
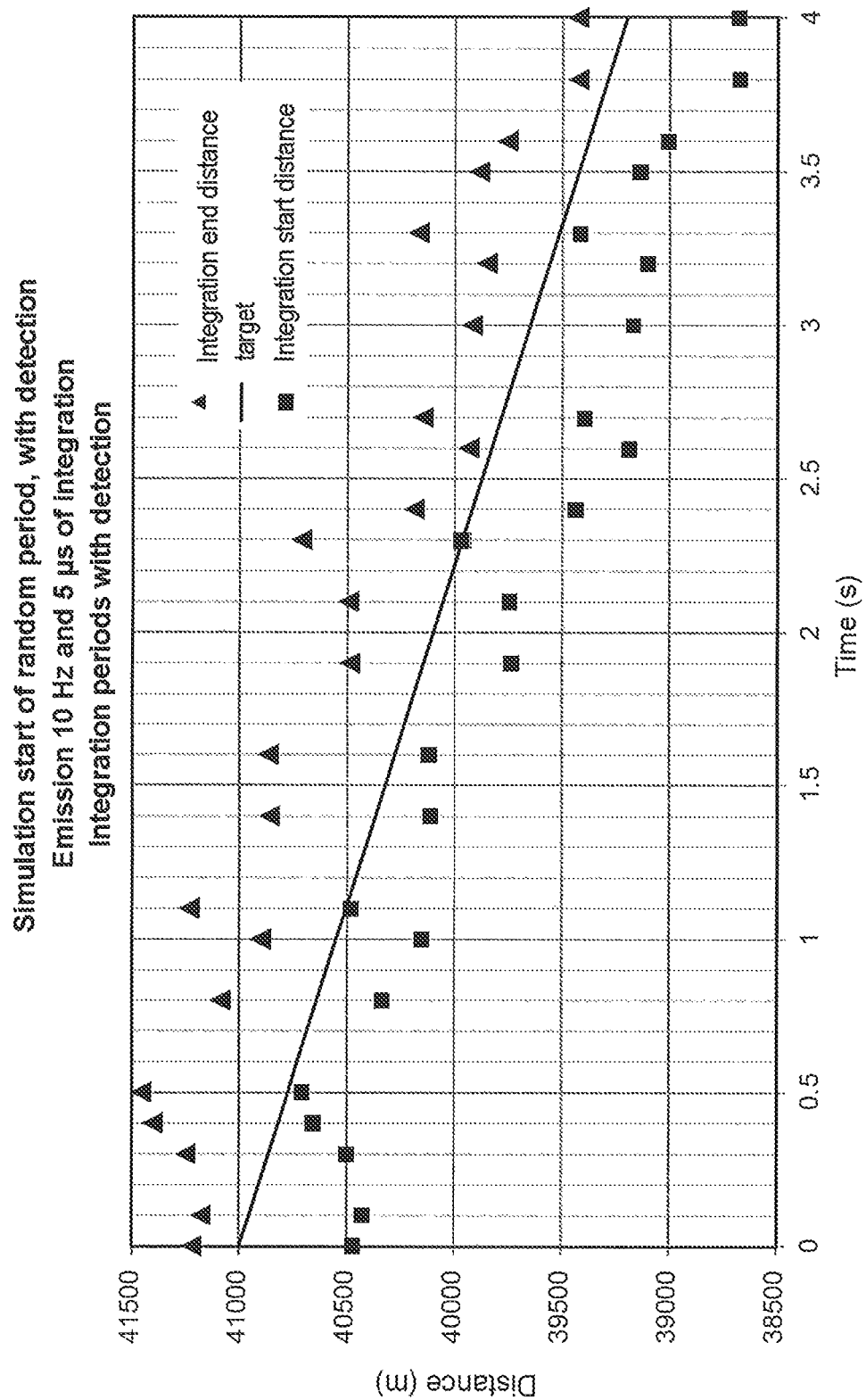
FIG. 7 represents the series of distance slices of FIG. 6 with only the slices in which the target has been detected, as well as the trace of the target as a function of time, FIG. 8 reprises FIG. 7, adding thereto the limit straight lines whose slopes are that of the maximum and minimum speeds predetermined for each integration period, and then the straight line whose slope is the maximum speed calculated on completion of the measurement when the predetermined maximum speed is no longer valid.

The processing is done in parallel with the emissions and with the acquisition of the integration periods with detection. For the processing, only the data corresponding to detections are preserved, as is shown in FIG. 7.

The last duration of integration with detection of the step of first reduction is 5 µs. It was between 270 and 275 µs corresponding to a possible distance of 40472 to 41221 m (for an exact speed of light in vacuo).

In the course of the following four seconds (=system measurement time), with pulses emitted at a repetition frequency of 10 Hz, the position of the integration period evolves randomly as described hereinabove. The width of the duration of integration is 5 µs. Its position depends on the previous position displaced by a random value in a direction depending on the detection or non-detection in the previous period.

Processing of the Preserved Data.

Only the integration periods where there has been detection are retained, as is shown in FIG. 7. The pulses emitted at 0.2 or 0.6 or 0.7 s for example have not generated any echo detection and are therefore not retained.

The speed of the target is not known, but it lies between a limit maximum recession value and a limit minimum approach value. The limit minimum value and the limit maximum value are known assumptions. For example −1200 m/s when approaching and +300 m/s when receding.

Figure 8:
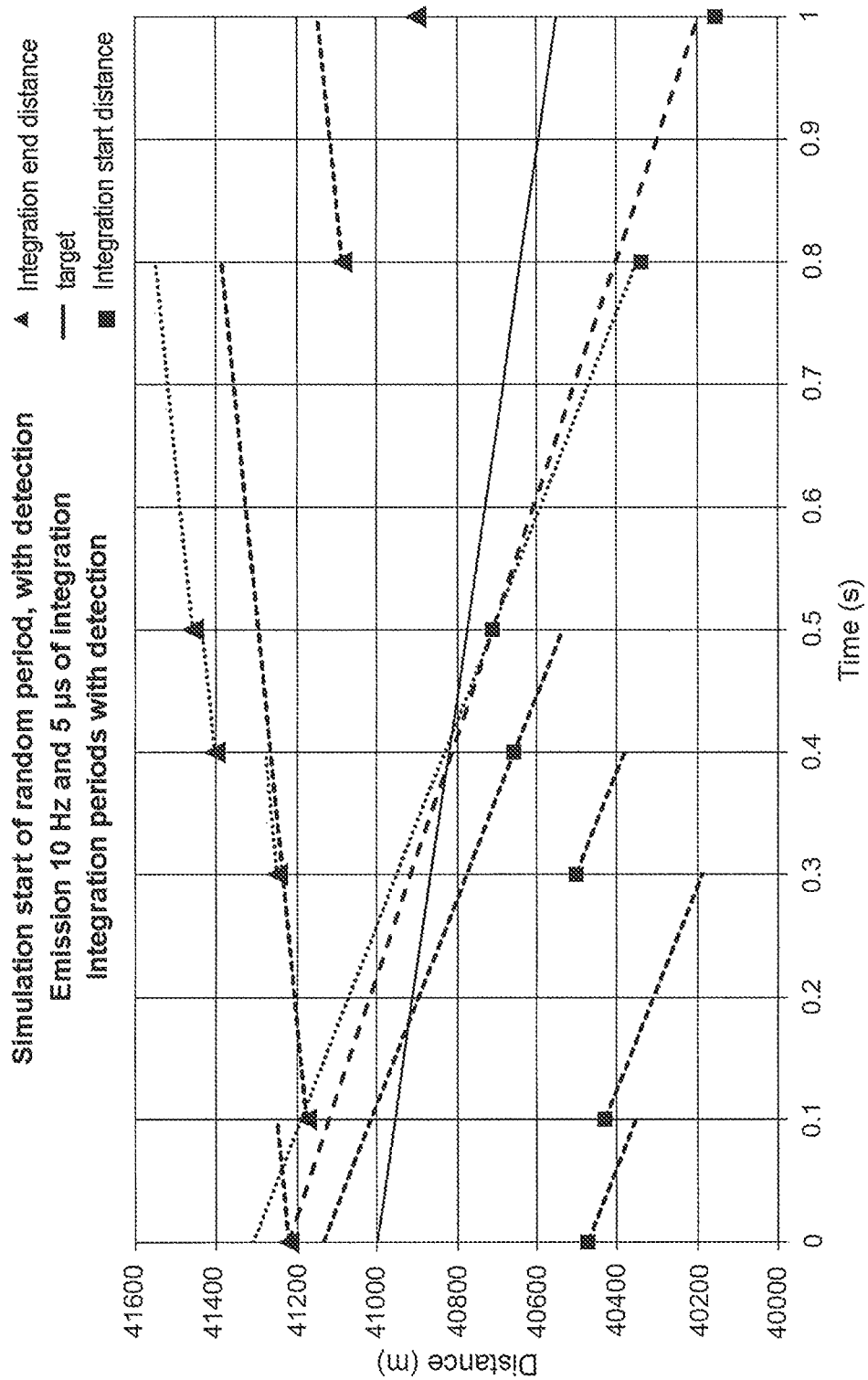

We shall describe the processing of the data in the course of the measurement, in conjunction with FIG. 8.

The period at time 0 represents the distance domain in which the target lies. The target has a constant relative speed belonging to the domain −1200 m/s and +300 m/s. On account of these limit speeds, between 0 and 0.1 s, the domain in which the target lies is delimited by the mean-dotted segments attached to the start and end of integration distances and whose slopes are the limit minimum speed and the limit maximum speed.

The new detection at 0.1 s delimits a distance domain which is included in the projection of the domain generated at time 0. The target is between the bounds of start and end of integration distances at 0.1 s, and is then in the domain delimited by the dotted straight lines resting on these bounds and whose slopes are the limit minimum speed and the limit maximum speed.

The next detection takes place at 0.3 s. The lower bound is included in the previous projection and therefore becomes the new bound. The upper bound (slender dotted projection) is beyond the segment resting on the upper bound at 0.1 s:

it is therefore not retained. The previous segment resting resting on the upper bound at 0.1 s still delimits the domain where the target lies.

At 0.4 s the lower bound becomes the new bound. It is noted that the trace resting on this bound has indeed always been included since time 0 in all the periods with detection. The upper bound is beyond the segment resting on the period at 0.1 s.

At 0.5 s the lower bound becomes the new bound. But the slope of the straight line representing the limit minimum speed of the target (slender dots) exits the periods at 0 and at 0.1 s: the target cannot therefore have this extreme minimum speed. The minimum speed of the target is not lower than the slope of the straight line passing through the upper bound at 0 s and the lower bound at 0.5 s.

The same holds at 1 s. The limit maximum speed is no longer the extreme maximum speed but the slope of the straight line (wide dots) resting on the lower bound at 0.5 s and the upper bound at 1 s.

When there is no longer any straight line with slope equal to the extreme speeds that must pass through all the integration periods having had a detection, it is necessary to search for the straight lines whose slope is a maximum or minimum passing through all the detection periods. At any instant, the distance of the target lies between the last straight lines which are valid for the instants posterior to the bounds on which the two straight lines whose slopes are the minimum speed and the maximum speed rest.

With each detection $D_i$ are associated:
a time $t_i$ of emission of a pulse,
an integration start distance (Start integration) $Id_i$ called the lower bound of the detection $D_i$ and
an integration end distance (End integration) $If_i$ called the upper bound of the detection $D_i$.

After i detections, the maximum speed straight line is the straight line of largest slope all of whose starts of retained integration periods are below the straight line and all of whose ends of retained periods are above.

After each detection a maximum speed $VMax_{k,l}$ is calculated by taking account of the n sets of values accumulated since the start of this step.

$$VMax_{k,l} = \text{Minimum}\left[\frac{(If_j - Id_i)}{(t_j - t_i)}\right] \forall j > i \; \forall i < n$$

The indices k and l are the values of i and j of the lowest slope.

The maximum speed straight line passes through the lower bound of $D_k$ and the upper bound of $D_l$.

The other straight lines do not pass through all the integration periods with detection from 0 to n.

Figure 9:
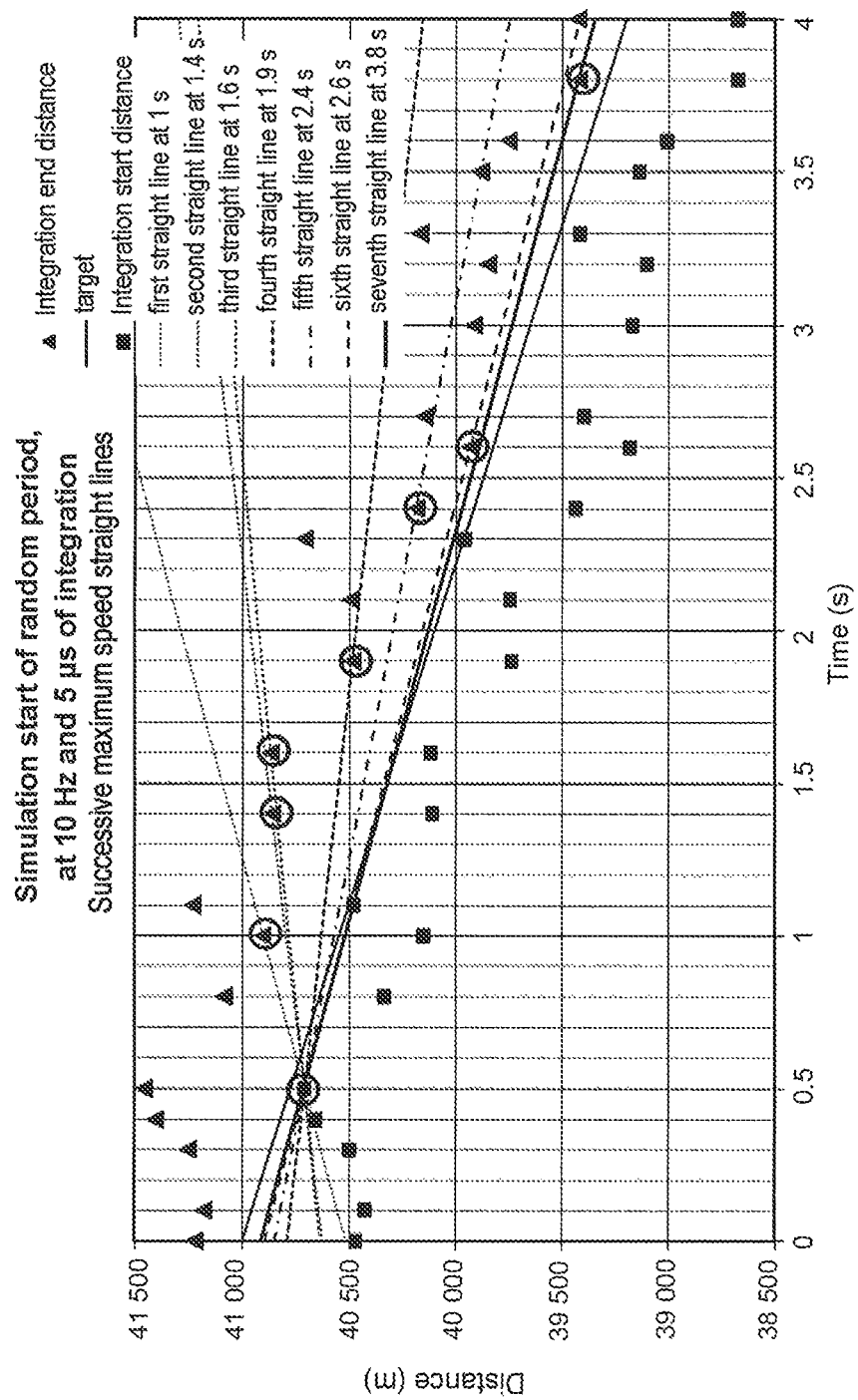
FIG. 9 reprises FIG. 7, adding thereto various straight lines whose slopes are the maximum speeds established over time, FIG. 10 reprises FIG. 7, adding thereto the various straight lines whose slopes are the minimum speeds established over time.

FIG. 9 shows as example the successive maximum straight lines in tandem with the acquisitions.

The very first straight lines are not represented since they correspond to maximum speeds that are much higher than the limit maximum speed assumption envisaged by the system which is here 300 m/s when receding.

The first straight line rests on the start of integration at 0.5 s and on the end of integration at 1.0 s. This straight line remains valid, taking into account the detection at 1.1 s.

A new straight line (second straight line) meets the criteria for detection up to 1.4 s. And so on and so forth.

The seventh straight line rests on the start of integration at 1.1 s and the end of integration at 3.8 s.

Figure 10:
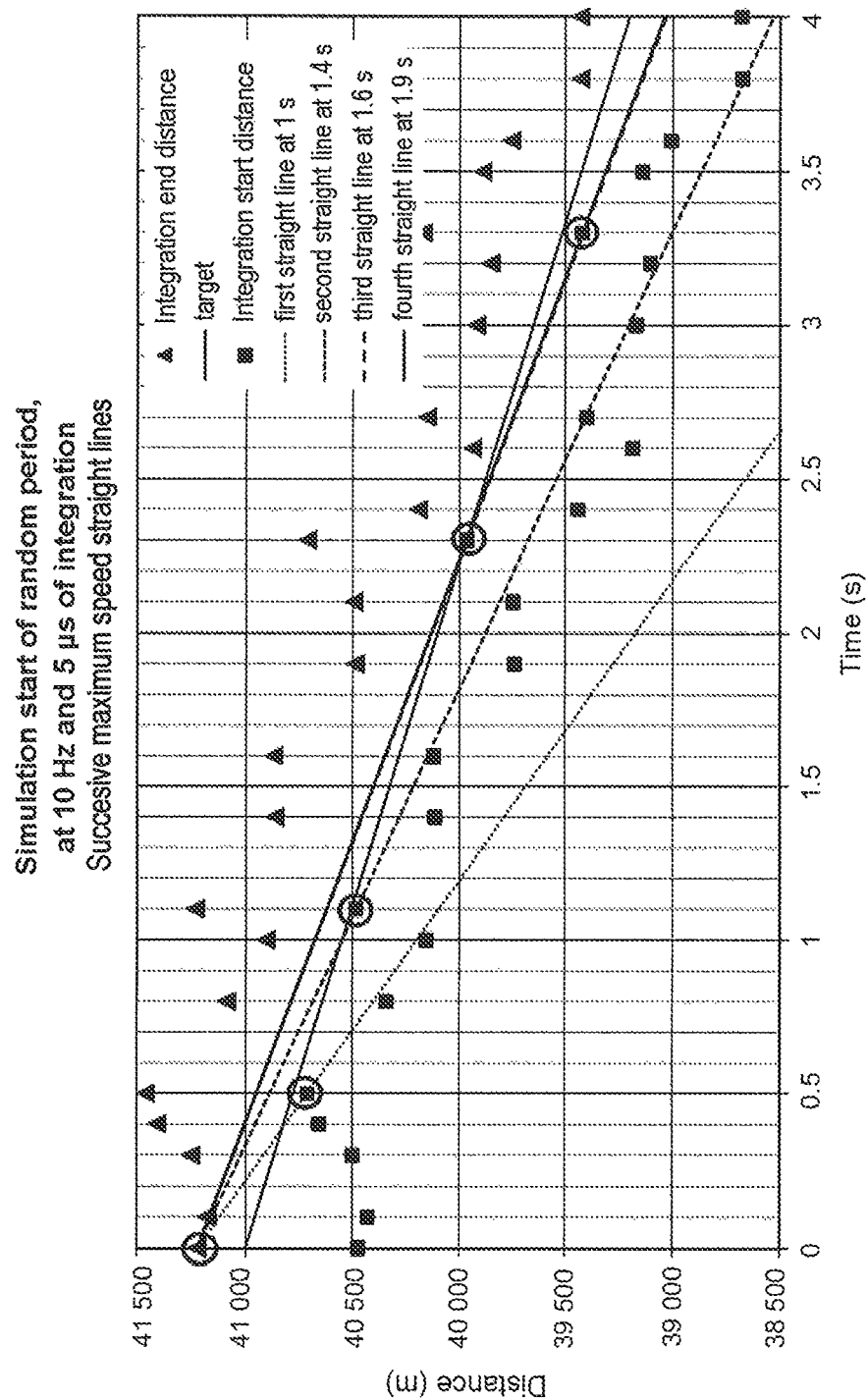

In the same way the minimum speed straight line $vMin_{t,u}$ is sought, with an example shown in FIG. 10. This is the straight line passing through the integration end distance and the later integration start distance, whose slope is the highest, and passing via all the integration periods from 0 to n.

$$VMin_{t,u} = \text{Maximum}\left[\frac{(Id_j - If_i)}{(t_j - t_i)}\right] \forall j > i \; \forall i < n$$

The indices t and u are the values of i and j of the highest slope.

The minimum speed straight line passes through the upper bound of $D_t$ and the lower bound of $D_u$.

The other straight lines do not pass through all the integration periods with detection from 0 to n.

Figure 11:
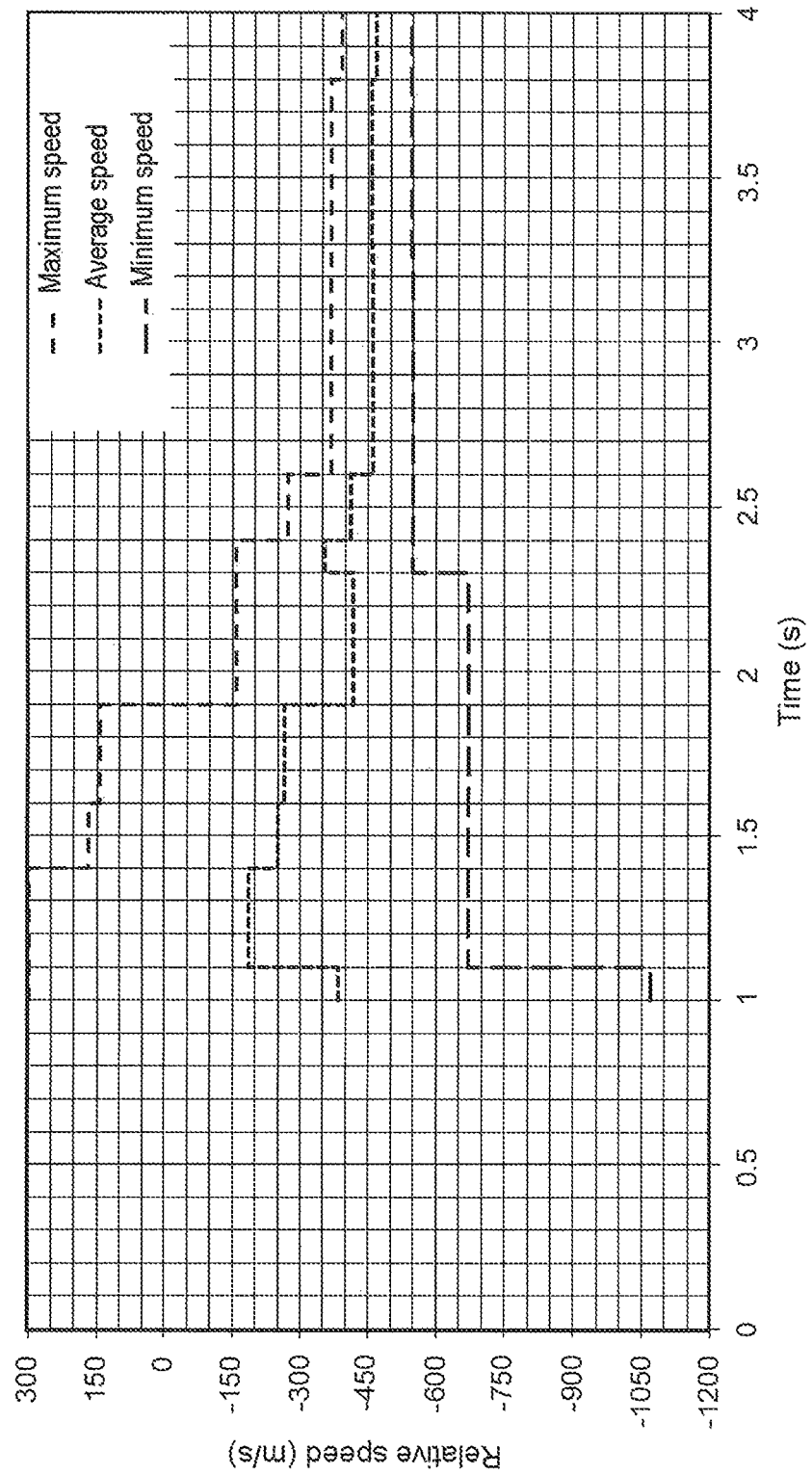
FIG. 11 represents the evolution over time, of the maximum speed, of the minimum speed and of their average.

In tandem with the detections the bracketing of the actual speed by the minimum speed and the maximum speed, reduces. FIG. 11 shows an exemplary evolution of the values of the minimum and maximum speeds between which the estimated speed of the target lies. The average value is a good estimation which converges toward the actual speed. For the record in this simulation the speed of the target is −450 m/s.

In tandem with the process, after each detection, the minimum speed straight line and the maximum speed straight line are recalculated. For later times they bound the distance domain in which the target is deploying. At each instant after the last detection, the two straight lines bound the distance domain where the target lies.

Figure 12:
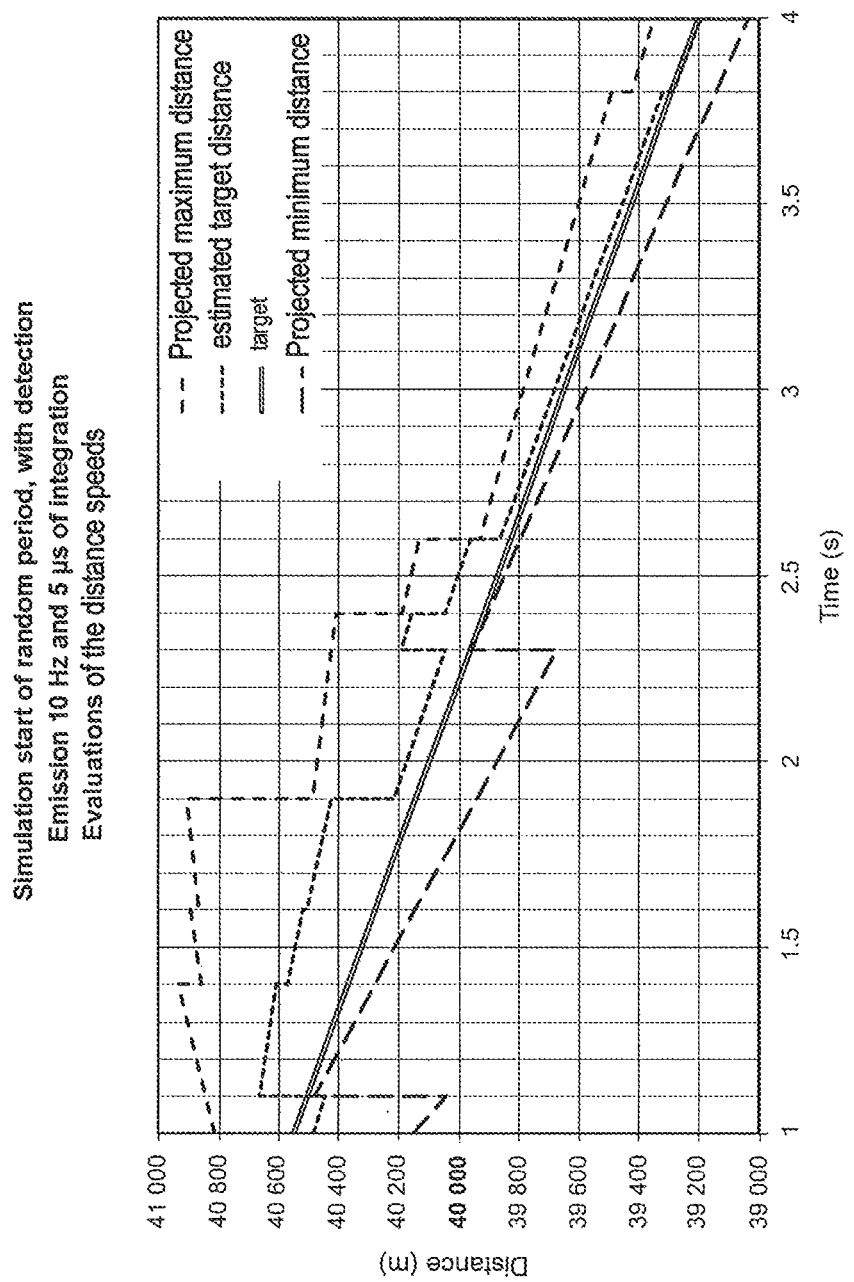
FIG. 12 represents the evolution over time, of the projected maximum distance, of the projected minimum distance, of the projected average distance and the variation of the actual distance of the target.

At each instant the average value is an estimation of the distance of the target. The curve in FIG. 12 represents an exemplary evolution of the knowledge of the distance of the target over time. The tolerance associated with this value is given by the deviation between the two straight lines.

It is interesting to see that in this example shown in FIG. 12, the distance of the target estimated at 2.6 s is 35 m away from the actual position of the target, despite an integration period width corresponding to 750 m.

The method according to the invention exhibits the following advantages over the conventional detection method.

The conventional detection with the aid of a photodiode followed by a transimpedance circuit does not allow such good sensitivity as an imager. Moreover, the presence of the imager allows excellent alignment of the laser emission toward the target: the divergence of the telemetry beam can therefore be reduced. This having the advantage of increasing the illumination of the target and therefore of providing a stronger echo. There is a gain in the sensitivity of the detection of the echo and a strengthening of the echo. It follows therefrom that for one and the same laser source and one and the same diameter of the reception optics the telemetry range is significantly increased.

The imager can furthermore provide deviometry parameters of the target so as to allow fine pursuit of the target.

The invention claimed is:

1. A method of measuring distance of a target by means of a pulse emitter and of a matrix detector comprising spatial mini-detectors coupled to capacitors whose duration of integration is controlled by a polarization of the mini-detectors, which comprises the following steps:

A) determination of the direction of the target with respect to a known direction of the emitted pulses, and of a first integration period during which an echo of a pulse emitted by the emitter and backscattered by the target is detected by the detector, determining a first distance slice in which the target is situated, B) reduction of the first distance slice in the course of successive telemetry iterations, that is to say emission of a pulse by the emitter and testing of detection of an echo by the detector, which are carried out:

on the basis of the first integration period, by dichotomy of the duration of integration and until a predetermined minimum duration of integration is reached, and based on the detection of an echo of the target, a second distance slice in which the target is situated, and included in the first distance slice, being determined on completion of this step on the basis of the integration period of the last iteration, C) reduction of the second distance slice in the course of successive telemetry iterations which are carried out:

on the basis of the integration period arising from step B, by variations of the position of the integration period, with constant durations of integration, and based on the detection of an echo of the target, a third distance slice in which the target is situated, and included in the second distance slice, being determined on completion of this step.

2. The method of measuring distance of a target as claimed in claim 1, wherein the direction is determined in passive mode and in that the first distance slice is determined in active mode by the following sub-steps:

choosing of an initial integration period defined by a predetermined temporal position and a maximum duration of integration, corresponding to a distance slice, scanning of a distance domain predetermined by telemetries, on the basis of the initial integration period and in adjacent successive integration periods of the same duration of integration, the first integration period during which an echo is detected determining the first distance slice in which the target is situated.

3. The method of measuring distance of a target as claimed in claim 1, wherein the direction and the first distance slice are determined simultaneously and in active mode.

4. The method of measuring distance of a target as claimed in claim 1, wherein in that in the course of the successive iterations, the integration periods are established by taking into account a predetermined overlap related to a low sensitivity of the detector at the start of the duration of integration.

5. The method of measuring distance of a target as claimed in claim 1, wherein the target has a relative speed and in that in the course of the successive iterations each integration period is established by taking into account the relative speed of the target.

6. The method of measuring distance of a target as claimed in claim 5, wherein the relative speed is known.

7. The method of measuring distance of a target as claimed in claim 1, wherein the variations of the position of the integration period are obtained by dichotomies of the position of the integration period in the course of the successive iterations, the third distance slice being determined on the basis of the integration period of the last iteration.

8. The method of measuring distance of a target as claimed in claim 1, wherein the target has a constant relative speed which is unknown but lies between a predetermined minimum approach speed and a predetermined maximum speed of recession, and in that the reduction in the second distance slice is obtained in the course of the successive iterations with at each telemetry:

a random variation of the position of the integration period according to a direction, the direction of variation reversing as soon as there is a first absence of echo detection according to an integration period with detection, when an echo has been detected, a recording of the date of emission of the pulse and of the position of the corresponding integration period, a calculation of a minimum speed straight line and of a maximum speed straight line on the basis of the dates and positions recorded, the relative speed of the target being between the slope of the minimum speed straight line and the slope of the maximum speed straight line, and at any instant, the third distance slice being between the minimum speed straight line and the maximum speed straight line.

9. A computer program product comprising a non-transitory computer readable medium comprising code instructions to perform the steps of the method of measuring distance of a target as claimed in claim 1, when said code instructions are executed on a computer.

10. A system for measuring distance of a target which comprises:

a pulse emitter, a matrix detector comprising spatial mini-detectors coupled to capacitors whose duration of integration is controlled by a polarization of the mini-detectors, and a processing unit configured to implement the method as claimed in claim 1.

* * * * *